United States Patent
Simon et al.

(10) Patent No.: US 11,703,228 B2
(45) Date of Patent: Jul. 18, 2023

(54) PELLET GRILL

(71) Applicant: Halo Products Group, LLC, Elizabethtown, KY (US)

(72) Inventors: Paul J. Simon, Elizabethtown, KY (US); Michael R. Giebel, Joplin, MO (US); Xianjia Fan, Zhongshan (CN)

(73) Assignee: HALO PRODUCTS GROUP, LLC, Elizabethtown, KY (US)

( * ) Notice: Subject to any disclaimer, the term of this patent is extended or adjusted under 35 U.S.C. 154(b) by 0 days.

(21) Appl. No.: 17/694,097

(22) Filed: Mar. 14, 2022

(65) Prior Publication Data

US 2022/0290865 A1 Sep. 15, 2022

Related U.S. Application Data

(63) Continuation-in-part of application No. 17/683,152, filed on Feb. 28, 2022, now Pat. No. 11,553,818.

(60) Provisional application No. 63/161,230, filed on Mar. 15, 2021.

(51) Int. Cl.
| | | |
|---|---|---|
| *A47J 37/07* | (2006.01) | |
| *F24B 1/20* | (2006.01) | |
| *F23B 40/04* | (2006.01) | |
| *F24B 13/04* | (2006.01) | |
| *B08B 9/045* | (2006.01) | |

(52) U.S. Cl.
CPC ........... *F24B 1/207* (2013.01); *A47J 37/0704* (2013.01); *A47J 37/0786* (2013.01); *B08B 9/045* (2013.01); *F23B 40/04* (2013.01); *F24B 13/04* (2013.01); *B08B 2209/04* (2013.01)

(58) Field of Classification Search
CPC ...... A47J 37/067; A47J 37/07; A47J 37/0704; A47J 37/0713; A47J 37/0722; A47J 37/0727; A47J 37/0754; A47J 37/0763; A47J 37/0786; A47J 37/0694; A47J 37/079; A47J 36/32; A47J 36/321; G01K 7/16; F24B 1/003; F24B 1/024; F24B 1/028; F24B 1/207; F24B 13/006; F24B 13/008; F24B 13/02; F24B 13/04; B08B 9/045; B08B 9/08; B08B 9/0808; B08B 2209/04; F23B 40/00; F23B 40/02; F23B 40/04; F23B 40/08
See application file for complete search history.

(56) References Cited

U.S. PATENT DOCUMENTS

| | | | | |
|---|---|---|---|---|
| 1,729,211 | A * | 9/1929 | Erisman | B65G 33/32 198/723 |
| 6,679,559 | B2 * | 1/2004 | Keim | E21C 25/58 175/323 |
| 2009/0293860 | A1 * | 12/2009 | Carlson | F24B 13/04 126/516 |

(Continued)

*Primary Examiner* — Hung D Nguyen
(74) *Attorney, Agent, or Firm* — Yohannan Law; David R Yohannan

(57) ABSTRACT

A solid pellet fueled apparatus having a duel auger system and multi/high speed auger motor is disclosed. The duel auger may include first and second auger blades mounted on a single auger shaft having blade pitches configured to convey solid fuel in opposite directions towards a central burn pot. Each auger blade may service a separate solid fuel compartment provided in a single hopper. The auger motor may have a high-speed setting that may be selected for solid fuel clean out.

21 Claims, 10 Drawing Sheets

(56) References Cited

U.S. PATENT DOCUMENTS

| | | | |
|---|---|---|---|
| 2015/0320259 A1* | 11/2015 | Tucker | F24B 13/04 |
| | | | 126/10 |
| 2018/0036693 A1* | 2/2018 | Dubey | B29B 7/489 |
| 2021/0180793 A1* | 6/2021 | James | F24B 13/04 |
| 2021/0293413 A1* | 9/2021 | Donnelly | F23Q 7/02 |

* cited by examiner

(12) United States Patent

PELLET GRILL

CROSS-REFERENCE TO RELATED APPLICATIONS

This application claims the benefit of U.S. Provisional Application No. 63/161,230 filed Mar. 15, 2021 and the benefit of U.S. Nonprovisional application Ser. No. 17/683,152 filed Feb. 28, 2022, the disclosures of which are hereby incorporated by reference herein in their entireties.

FIELD OF THE INVENTION

Embodiments of the present invention relate to food cooking appliances.

BACKGROUND OF THE INVENTION

Outdoor cooking, and particularly the use of outdoor barbecue grills, smokers, and griddles, remains very popular. A number of different appliances are currently available to cook food outdoors. Such appliances require some form of power and/or fuel to generate the heat required for cooking, or in some instances to power systems used to ignite and control the combustion of a given fuel. Over the years, the most popular power/fuel source has varied. Historically, popular heat/fuel sources have included electrical heating elements, wood logs and chips, charcoal briquettes, propane gas, natural gas, and more recently biomass pellets. References herein to a "pellet grill" are intended to include all barbecue grills, smokers, ovens, heaters, and griddles that use some form of pelletized (i.e., solid) fuel, whether or not such fuel is technically considered biomass fuel.

Biomass pellets have several advantages over other fuel sources for outdoor cooking. For one, biomass pellets are relatively easy and safe to transport and store. As compared with charcoal or wood, biomass pellets are also capable of providing a controlled burn rate and level of heat. Still further, biomass pellets may be manufactured to provide a particular "flavor" to the food by as a result of combusting a pellet including a particular wood type. For example, a consumer may select hickory, maple, or cherry pellets, or a combination of pellet flavors, to impart a desired flavor to the cooked food.

Existing pellet grills, however, do have some disadvantages as currently designed. For example, existing pellet grills typically require a continuous supply of alternating current (AC) power limiting the use of the grill to locations with such power supplies. Thus, there is a need for a pellet grill that is untethered to a continuous supply of AC electrical power, such as a battery powered pellet grill.

In order to provide a truly portable and convenient pellet grill untethered to an AC power source, it may be advantageous to provide a pellet grill that can be used on a table top surface. Accordingly, there is a need also for a pellet grill that can easily convert between being used on a grill cart and being used on a table top surface.

In order to provide a pellet grill untethered to an AC power source, it may be advantageous to reduce the power required to convey solid pellet fuel to the grill burn pot. Accordingly, there is a need also for a pellet grill that provides improved conveyance of fuel pellets from a storage hopper to a combustion area, such as a burn pot by reducing the power required to convey a given mass of pellet to a burn pot, and to power a pellet grill in general.

Known pellet grills include a single hopper for storage of solid pellet fuel for use in combustion. However, some users desire a mixture of pellet flavors for cooking. Accordingly, there is a need also for a pellet grill which improves the ease with which different flavors of pellet can be utilized and/or mixed together during the cooking process.

Known pellet grills utilize a single speed motor and single auger to convey solid fuel pellets to a burn pot, or alternatively, to an exit for replacement or repair. The single speed auger motor may take a fairly long time to empty a full pellet hopper. Accordingly, there is a need also for a pellet grill that improves the ease with which a new flavor of pellet can replace an existing flavor of pellet stored in the grill hopper.

Known pellet grills require a system for removing the ash that remains after combusting solid pellet fuel. Existing ash removal systems can be messy and cause ash to spill on the ground or underlying surface. Accordingly, there is a need also for a pellet grill that improves the ability and speed of clearing pellet ash from the grill for cleaning purposes.

OBJECTS OF THE INVENTION

Accordingly, it is an object of some, but not necessarily all embodiments of the present invention to provide a pellet grill that is untethered to a continuous supply of AC electrical power.

It is also an object of some but not necessarily all embodiments of the present invention to provide a pellet grill that can easily convert between being used on a grill cart and being used on a table top surface by providing a removable grill cart and retractable feet in a grill body or head unit.

It is also an object of some but not necessarily all embodiments of the present invention to provide a pellet grill that provides improved conveyance of fuel pellets from a storage hopper to a combustion area, such as a burn pot, by including multiple auger blades for convey of solid fuel.

It is also an object of some but not necessarily all embodiments of the present invention to provide a pellet grill which improves the ease with which different flavors of pellet can be utilized during the cooking process by providing a solid fuel hopper having multiple distinct compartments that may each contain a solid fuel of a different flavor.

It is also an object of some but not necessarily all embodiments of the present invention to provide a pellet grill that improves the ease with which a new flavor of pellet can replace an existing flavor of pellet stored in the grill hopper by providing for high-speed auger motor operation for a pellet replacement procedure.

It is also an object of some but not necessarily all embodiments of the present invention to provide a pellet grill that improves the ability to clear all pellets from the grill for cleaning and/or replacement purposes by providing for high-speed auger motor operation for a pellet clean-out procedure.

It is another object of some, but not necessarily all embodiments of the present invention to provide a pellet grill that reduces the power required to convey a given mass of pellet to a burn pot, as well as reduces the electrical power requirements, in general, of a pellet grill, by providing a duel auger blade system that conveys solid fuel to a central burn pot location from right and left storage locations.

In is another object of the some, but not necessarily all embodiments of the present invention to provide a pellet grill that improves upon the ash removal process by improving upon the burn pot removable base design.

SUMMARY OF EMBODIMENTS OF THE INVENTION

Responsive to the foregoing challenges, Applicant has developed an innovative cooking grill, comprising: a solid fuel hopper; a burn pot; and an auger system including a first auger blade and a second auger blade, wherein the first auger blade has a first pitch configured to convey solid fuel in a first direction and the second auger blade has a second pitch configured to convey solid fuel in a second direction, and wherein the first direction and the second direction are different directions.

Applicant has further developed an innovative cooking grill, comprising: a grilling surface; a solid fuel hopper disposed along a front portion of the cooking grill directly in front of the grilling surface; a burn pot; and an auger system disposed between the solid fuel hopper and the burn pot, said auger system including a first auger blade and a second auger blade.

Applicant has still further developed an innovative method of solid fuel clean-out and/or replacement for a cooking grill, comprising the steps of: providing a solid fuel hopper having solid fuel in a first compartment and solid fuel in a second compartment; providing a first auger blade dedicated to convey solid fuel from the first compartment; providing a second auger blade dedicated to convey solid fuel from the second compartment; rotating the first auger blade and the second auger blade at a first speed to convey solid fuel from the first compartment and the second compartment for solid fuel burning operation; and rotating the first auger blade and the second auger blade continuously at burning operation speed, or optionally at a second higher speed, to convey solid fuel from the first compartment and the second compartment for solid fuel clean-out operation.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Figure 1:
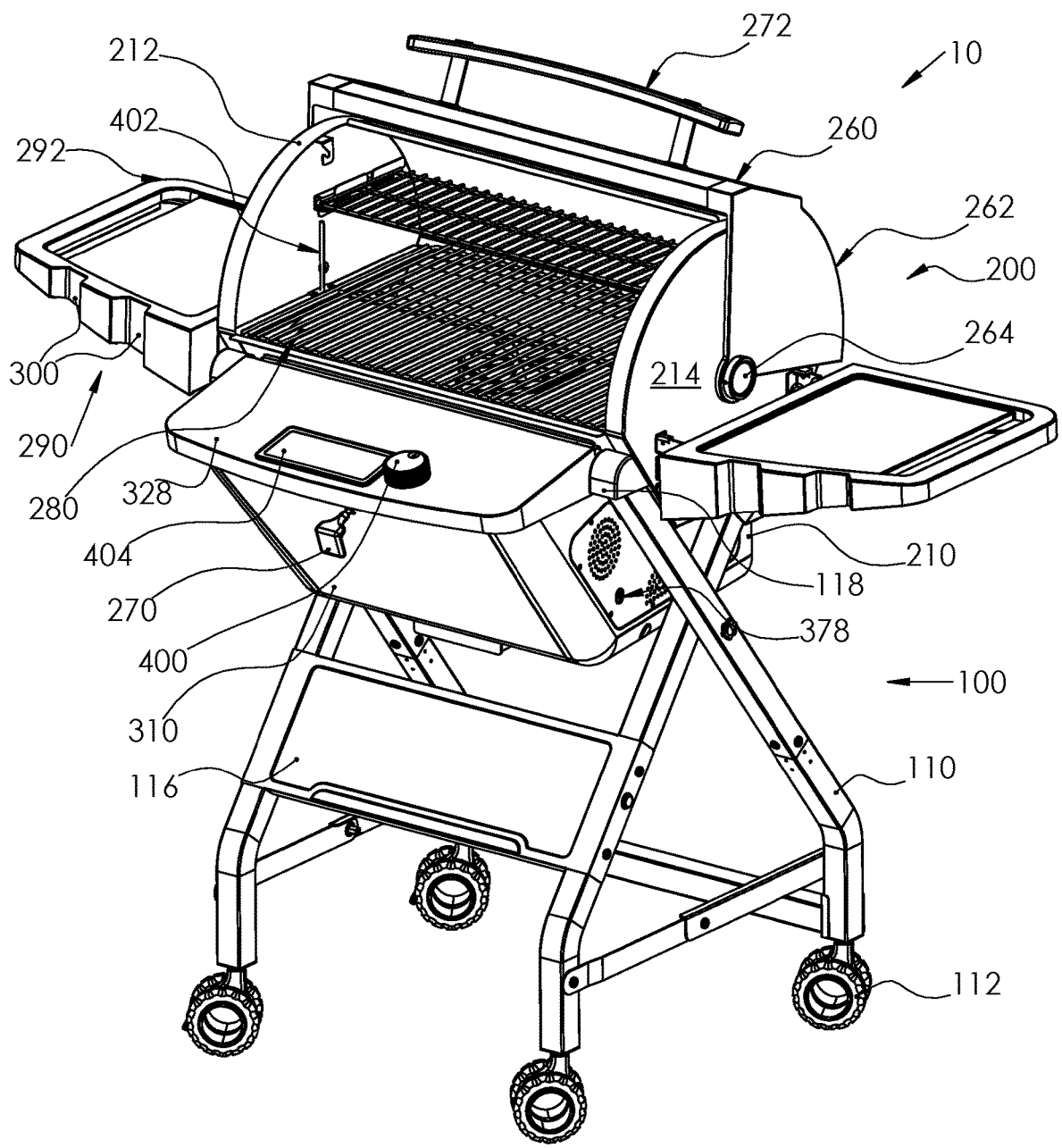
FIG. 1 is a perspective view of the front of a pellet grill with the hopper lid closed in accordance with embodiments of the invention.
Figure 2:
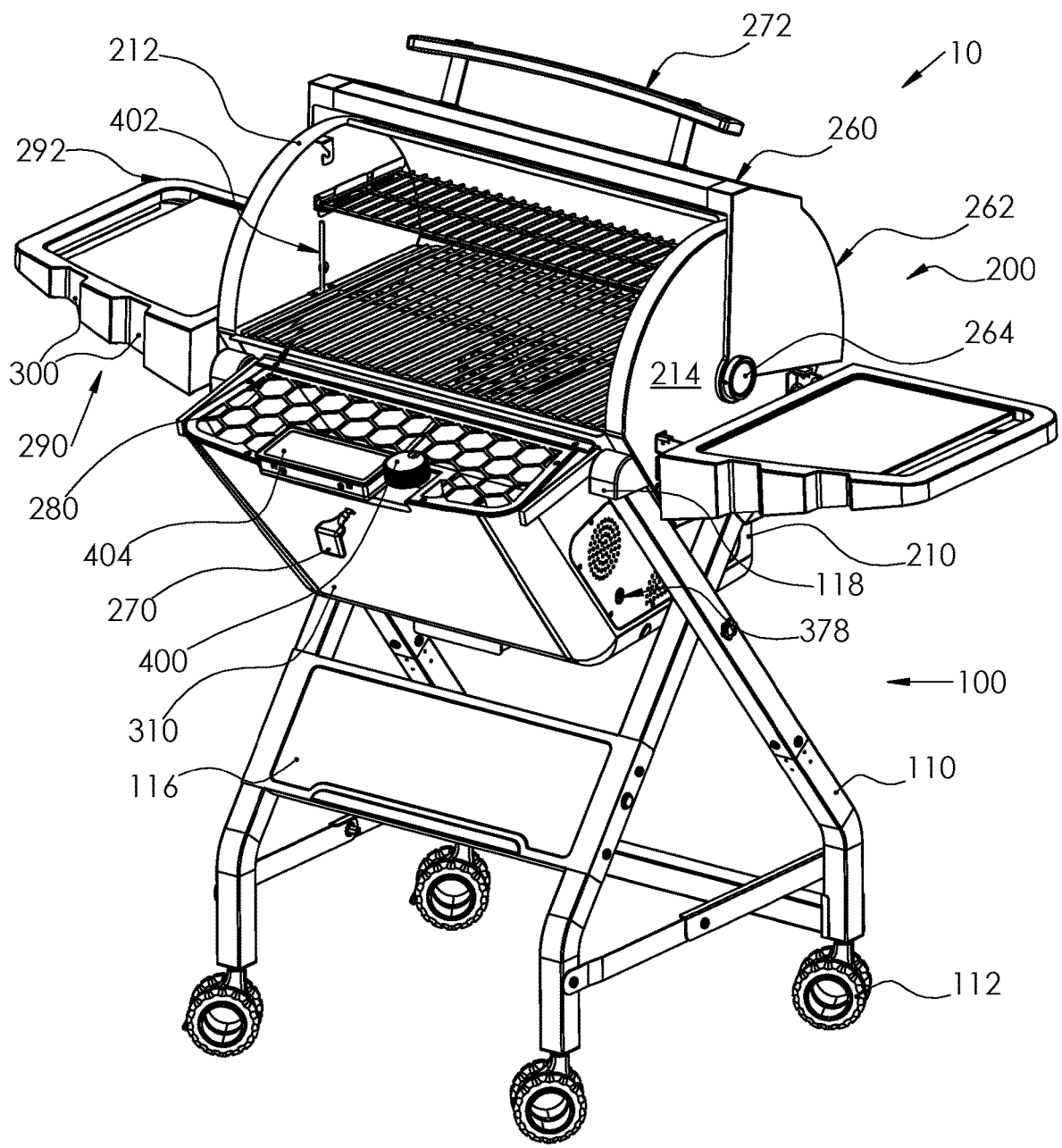
FIG. 2 is a perspective view of the front of a pellet grill with the hopper lid removed in accordance with embodiments of the invention.
Figure 3:
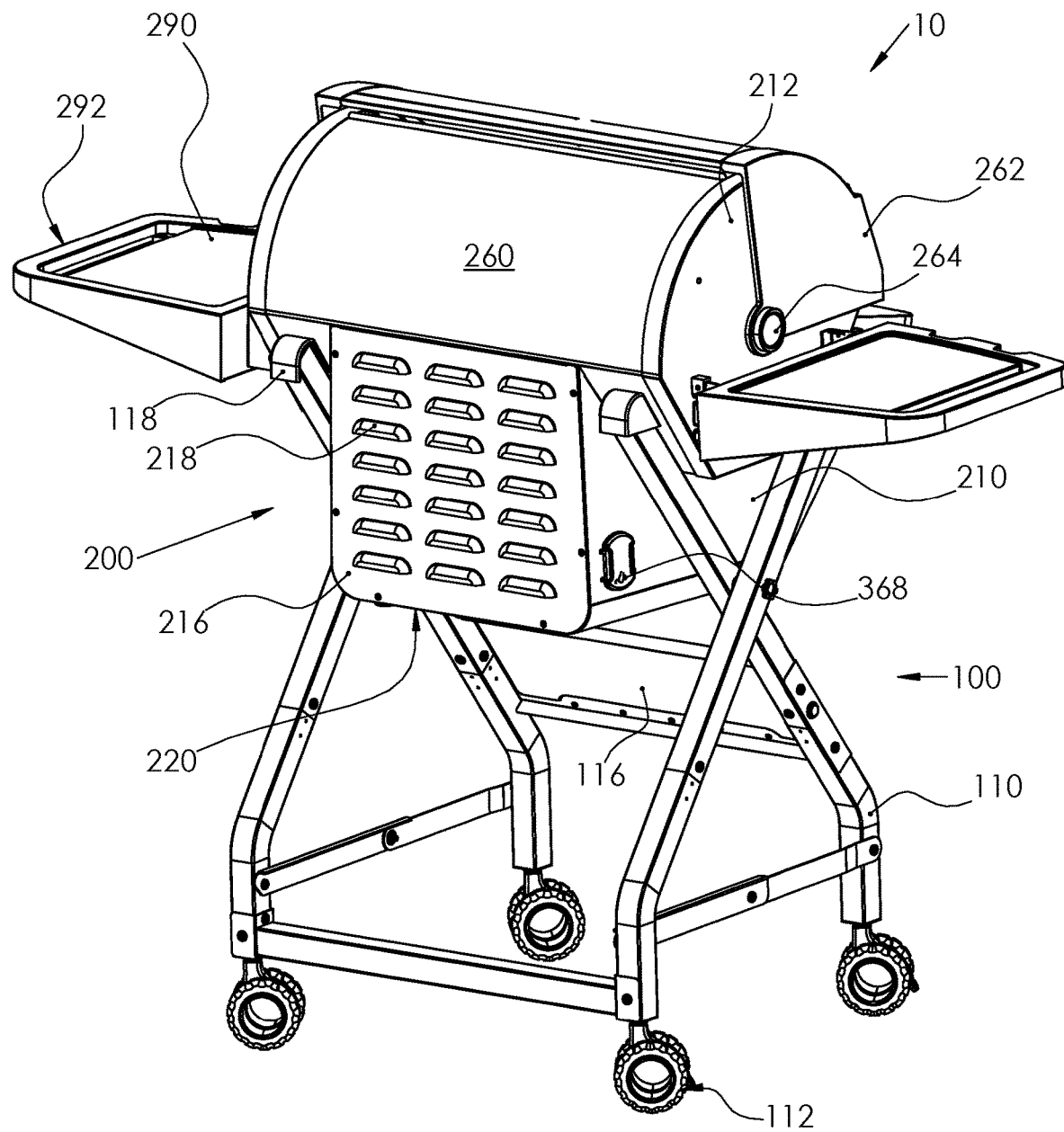
FIG. 3 is a perspective view of the back of a pellet grill in accordance with embodiments of the invention.

Reference will now be made in detail to embodiments of the present invention, examples of which are illustrated in the accompanying drawings. With reference to FIGS. 1-3, a pellet grill 10 may include a lower cart 100 and an upper head unit 200. The cart 100 may include two sets of interconnected base legs 110 joined by one or more cart lateral supports 116 and central fashioners, such as screws, bolts, cotter pins, or the like. The cart legs 110 may be provided with caster wheels 112 and wheel locks. The leg tops 118 may be removably connected to the head unit 200. The size, shape, and design of the cart 100 may be varied without departing from the intended scope of the invention. For example, in alternative embodiments, the cart may include an enclosed cabinet for storage and/or esthetic purposes.

The head unit 200 may include a grill body 210 having a left side wall 212, and a right side wall 214, respectively. Side tables 290 may be connected to the grill body 210 along the left and right side walls 212 and 214 by one or more hinges at brackets. Optional silicone, or other cushioning material, bushings (not shown) may be provided on the brackets to act as a cushioned stop between the lid 260 and the grill body 210 (explained below). The outer edges of the side tables 290 may be provided with handles 292 adapted for gripping. The handles 292 may be grasped to pivot the side tables 290 upward about the hinges so that the top surfaces of the side tables are substantially flush with the side walls 212 and 214 of the head unit 200. When the side tables 290 are in this upward position, the head unit 200 may be lifted from, and/or placed back on, the cart 100. The head unit 200 or the leg tops 118 may be provided with connection mechanisms to lock and unlock the head unit 200 to/from the cart 100. The side tables 290 may also be provided with one or more scalloped recesses 300 with raised embossed interior surfaces. The embossments may be provided with flat magnets on their inner surfaces so as to provide magnetic tool holders.

The front of the head unit 200 may include a pellet hopper 310 that has a side-to-side width that is substantially the same as the width of the grill body 210 (i.e., the distance between the left side wall 212 and the right side wall 214). The pellet hopper 310 may have smoothly shaped edges to prevent injury to a grill user. The pellet hopper 310 also may taper inwardly from top to bottom to allow the grill user to more easily gain access to and operate the grill, and to promote the flow of pellets in a downward direction under the influence of gravity. An example of the inward taper of the pellet hopper 310 is readily visible from FIG. 4. With renewed reference to FIGS. 1-3, the lid 328 of the pellet hopper 310 may include a center recess adapted to receive a readout panel/controller 404 and a control knob 400. The readout panel/controller 404 may be wirelessly or plug-in connected to various electrical components in the grill, such as a battery, auger motor, fan assembly, and spark generator (discussed below).

The head unit 200 may also include a rollback lid 260 having opposing lid sides 262 and a front contoured or bowed handle 272. The lid 260 is shown in a closed position in FIG. 3; and the lid is shown in an open position in FIGS. 1-2. The lid sides 262 may include lid side pivot point caps 264 that conceal the pivot assembly that moveably connects the lid 260 to the grill body 210. Each pivot assembly may include, for example, a lid side end bracket (not shown) which receives a shaft (not shown) about which the lid 260 may pivot between open and closed positions. The lid side end bracket may be used to space the lid 260 from the grill body 210 so that the lid may pivot relatively freely about the shaft connecting it to the grill body. The pivot shaft may be retained in place by a washer/fastener assembly (not shown) driven into the shaft from the interior of the grill body 210. Alternative embodiments may include a pivot bearing disposed between the lid 260 and the shaft to further improve the pivoting motion.

With reference to FIG. 3, in which like reference characters refer to like elements, as shown by the view of the back and side of the pellet grill, the head unit 200 and more particularly, the grill body 210, may include a rear wall 216 having a plurality of rear wall louver vents 218 and extending vertically upward from a grill body bottom 220. The top of the grill body 210 may also include a top flange having one or more vent openings (not shown in this embodiment) for the cooking chamber. The top flange may be configured to nearly contact, but remain free of, the lid 260 when the lid pivots between open and closed positions. Preferably, the lid 260 may be configured to pivot through close to ninety (90) degrees of arc, or more preferably, more than ninety (90) degrees of arc in some embodiments.

The grill body may surround and support a primary cooking surface 280 disposed above a flue gate (discussed below). A flue handle 270 may be connected to and control the position of the flue gate. A Resistance Temperature Detector (RTD) 402 may be mounted along an interior wall of the grill body 210. The RTD 402 may be electrically connected to the readout panel/controller 404. A combination battery charger and AC receptacle 378 may be connected to the readout panel/controller 404 and battery (discussed below).

Figure 4:
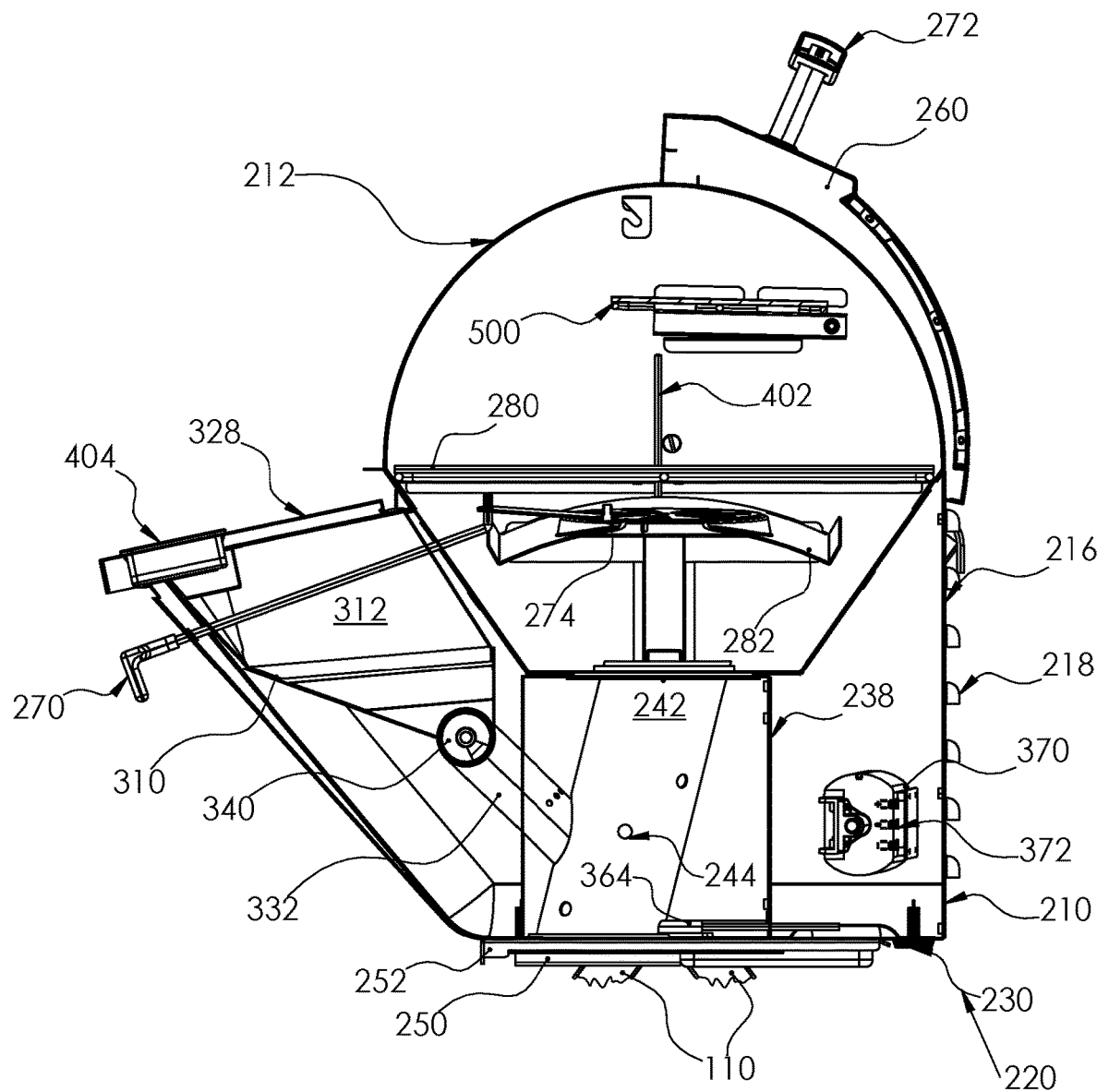
FIG. 4 is a right side cross-sectional view of a pellet grill in accordance with embodiments of the invention.

With reference to FIG. 4, the grill body 210 may include a warming rack 500 provided above the primary cooking surface 280. A bowed grease plate 282 may be disposed at an incline below the cooking surface 280. The central upward bow of the grease plate 282 may form two side channels to encourage the smooth flow of grease towards a grease drip port (not shown). Grease collected on the grease plate 282 flows downward through the grease drip port and into a grease receptacle 286 (shown in FIG. 6). Disposable liners may be provided for the grease receptacle.

With reference to FIGS. 4, 5, 9 and 10, the full and partial views of the grill body 210 reveal the interior of the hopper 310. The hopper 310 may include a first hopper compartment 312 and a second hopper compartment 314 separated by a hopper center wall 316. Each of the hopper compartments 312 and 314 may be used to store different types of pellet fuel. Each hopper compartment 312 and 314 may be further divided by hopper dividers (not shown) to provide for the storage of more than two types of pellet flavors in the hopper 310. Each of the four interior surfaces (e.g., front interior surface 320, rear interior surface 322, left interior surface 324 and right interior surface 326) of the first and second hopper compartments 312 and 314 may be inclined inwardly to encourage the downward flow of pellets in the compartments with the assistance of gravity. The bottom ends of the hopper compartments 312 and 314 may be open so that fuel pellets may drop from the hopper compartments into a dual blade auger 340. The hopper center wall 316 may be sized to provide support for the readout panel/controller 404.

With continued reference to FIGS. 4, 5, 9, 10 and 11, the auger 340 may have a left auger blade 342 and a right auger blade 344 set with opposing blade angles or pitches. The respective left and right auger blades, 342 and 344, may be configured to convey pellets inwardly from opposing (left side and right side) ends of the hopper 310 to a pellet feed tube 332 located near or at the center of the hopper. More specifically, the left auger blade 342 and the right auger blade 344 may have a colinear axis of rotation, and the two auger blades convey solid fuel pellets in different directions, preferably in opposite directions taken relative to a common reference line. The left and right auger blades, 342 and 344, may be connected to a single auger shaft 345, which in turn connects the two auger blades. An auger center piece 343 having one or more pins having a central axis extending away from the auger shaft in an orthogonal direction. The auger 340 may be supported by one or more auger bearings 346 and be partially encased by an auger housing 350 defining a passage extending between (i) the bottom ends of the first and second hopper compartments 312 and 314 and (ii) the pellet feed tube 332.

An auger motor 348 may drive the auger 340 at various predetermined speeds and/or for various durations under the control of the readout panel/controller 404 (shown in FIG. 1). The auger motor 348 may drive the auger 340 at one or more predetermined speeds and/or predetermined durations to provide a desired amount of fuel based on measured temperatures in the cooking chamber (i.e., the area above the cooking surface 280) and/or measured temperatures in the heating chamber (i.e., the area below the cooking surface). Temperature measurements may be taken using the RTD 402 (shown in FIG. 1) positioned as needed in the cooking chamber and/or the heating chamber. By using the dual auger 340 and the front loading hopper 310 shown, less power may be consumed by the auger motor 348 to convey a given mass of pellet fuel because the pellets are nearer the feed tube than is the case with known pellet grills, and because the pellets only need to be conveyed a short distance from opposing sides of the hopper to a central feed tube. This design also may be used to conduct a pellet replacement operation and/or a pellet hopper/compartment cleaning operation using the auger system. By removing the burn pot base (discussed below) solid fuel pellets may be conveyed from the first and second compartments 312 and 314 through the pellet feed tube 332 and out of the bottom of the burn pot 242 to a receptacle (not shown). Still further, under the control of the readout panel/controller 404, the auger motor 348 may be able to run continuously and/or at a relatively higher speed to quickly evacuate all pellets from the pellet hopper/compartment(s) for pellet clean-out operations and/or pellet replacement operations as compared with the rotational duration and/or speed of the auger motor for normal burn operation. For example, such clean-out operations may result from running the auger motor 348 continuously at least two to three times the speed than as for burn operation, or even tens of RPMs faster than for burn operation. Preferably, the clean-out operation speed of the auger motor is continuous running in the range of 1.5 to 4 RPMs greater than as for grill burn operation. In some embodiments, the higher clean-out speed may be selectively controlled by the user using the readout panel/controller or some other control device.

With continued reference to FIGS. 4, 5, 9 and 10, retractable feet 230 may be provided on the underside of the grill body bottom 220 so that the head unit can be set upon a table top. Each of the retractable feet 230 may include a laterally wide, but vertically compacted base attached to a central screw that may be advanced away from, or retracted into, the grill body bottom 220. The screws may be adjusted to provide leveling of the grill body for table top use.

Figure 5:
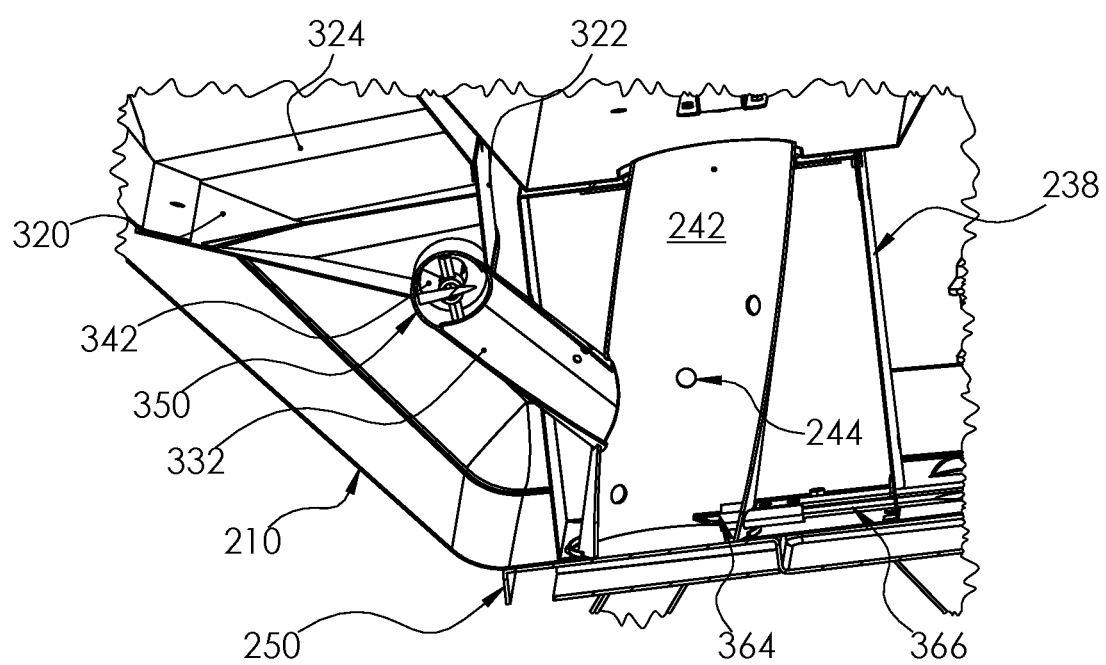
FIG. 5 is a cut-away cross-sectional view of a pellet grill head unit in accordance with embodiments of the invention.
Figure 10:
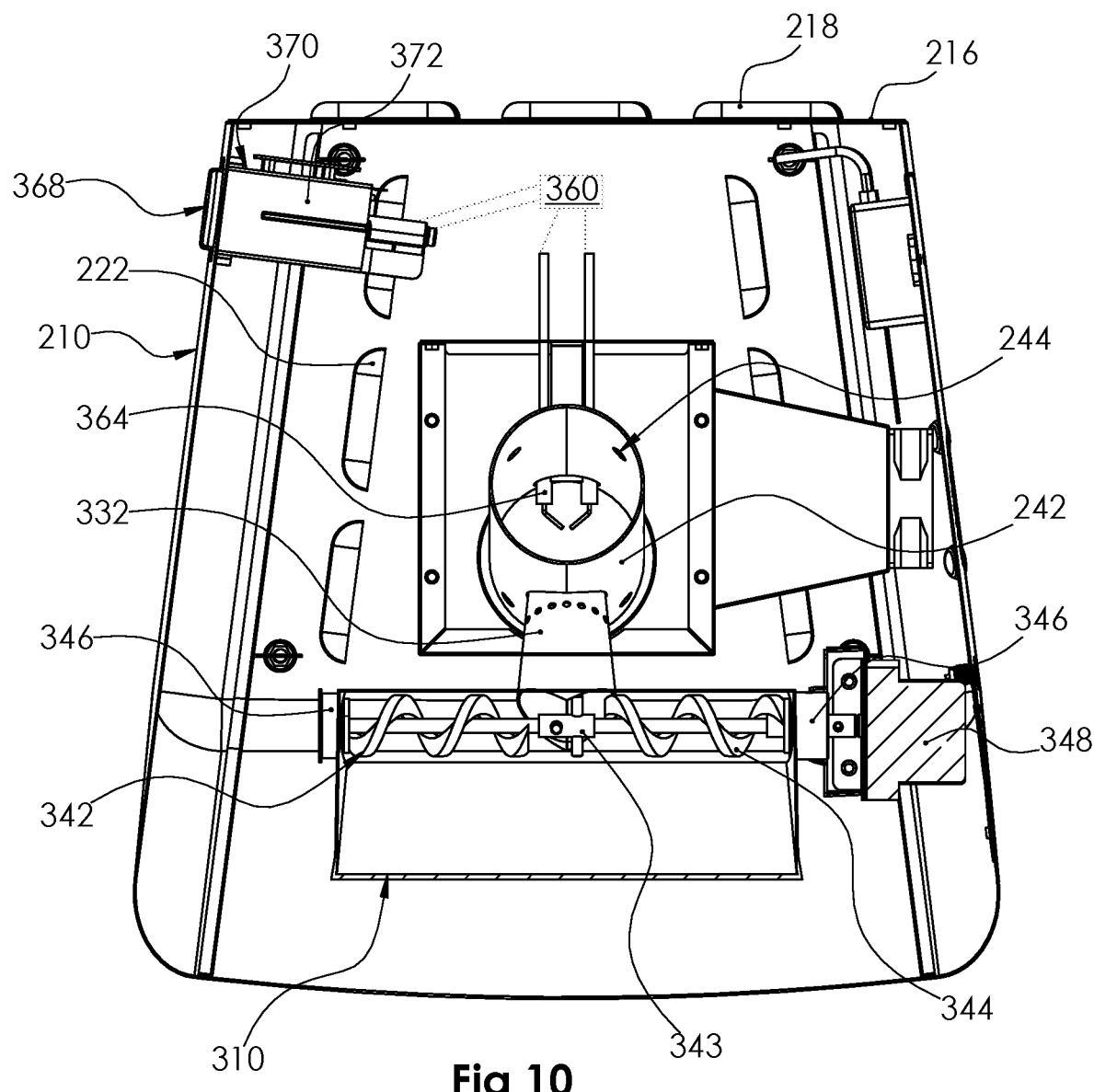
FIG. 10 is a top cross-sectional view of a pellet grill head unit in accordance with embodiments of the invention.

As shown in FIGS. 4, 5 and 10, the pellet feed tube 332 may be inclined downward and inward (i.e., towards the center of the grill body) to a burn pot 242. The burn pot 242 may include a number of openings 244 to provide air flow from outside of the housing to its interior. A dual ignitor or electrode 364 may extend through the walls of the burn pot 242 into the interior of the burn pot. The electrode 364 may include two tips separated by an air gap across which a continuous spark may be provided to ignite pellets in the burn pot 242. The electrode 364 may be retained in place using a pressure fit with the burn pot or other fastening means. An electrical connector 366 may connect the electrode 364 to a spark generator 360 that is in electrical communication with, and powered by, the battery 372 provided in battery compartment 370 behind battery compartment cover 368.

With reference to FIG. 10, a cross-sectional view of the grill body 210 is provided in which grill body bottom vents 222 are visible. The rear wall louver vents 218 in the grill body rear wall 216 with openings at the lower end of the louvers are also readily visible. Still further, the arrangement of a battery compartment 370, battery compartment cover 368, and a battery 372 are shown to be disposed as far as possible from the burn pot 242. It is appreciated that one or more heat shields may be provided between the battery 372 and the burn pot 242. The battery compartment 370 may also house an optional battery charger (not shown) that is connected to an AC receptacle 378 (shown in FIG. 1). The battery charger may be connected to the battery 372.

With reference to FIGS. 4 and 5, the burn pot 242 may be connected to a fan assembly 238 that may be used to draw air through fan intake vents and thereafter direct the air to the burn pot 242. The readout panel/controller 404 may be used to control the speed of the fan assembly 232, the speed of the auger 340, and/or the spark generator 360 to provide a selective level of pellet combustion and heat generation in the burn pot 242. The controller may use a feed-back loop including one or more of the RTDs 402 to provide a selected level of heat in the cooking chamber. The battery 372 may be of sufficient amperage and/or wattage to provide several hours of cooking operation in terms of power for the auger 340, the fan assembly 232, and the spark generator 360.

Figure 7:
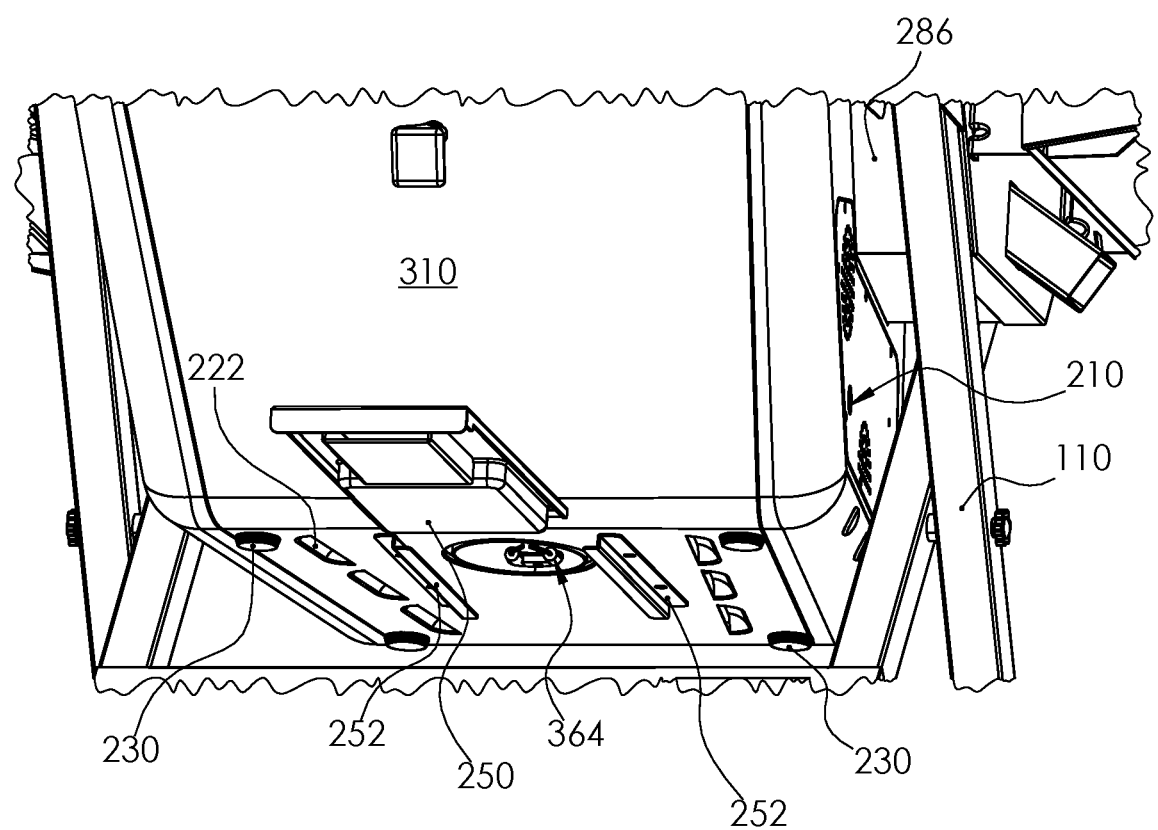
FIG. 7 is a cut-away view of the bottom portion of a pellet grill head unit with a burn pot removable base in an open or removed position in accordance with embodiments of the invention.
Figure 8:
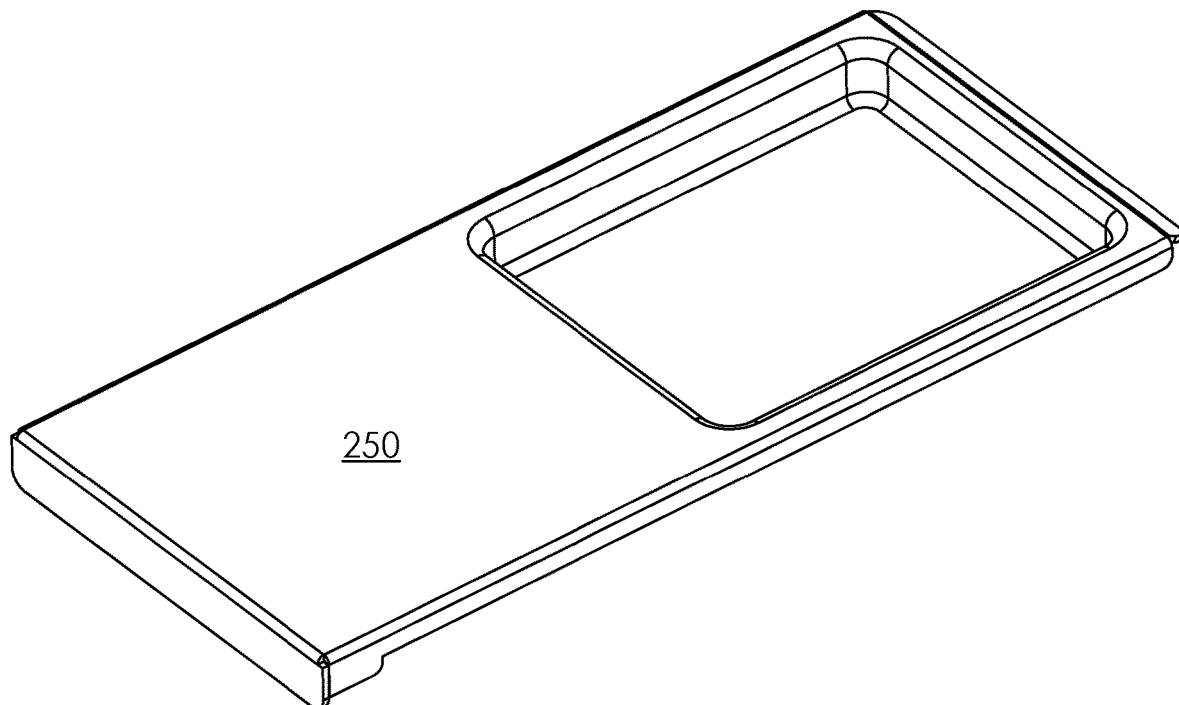
FIG. 8 is a perspective view of a removeable burn pot base in accordance with embodiments of the invention.
Figure 11:
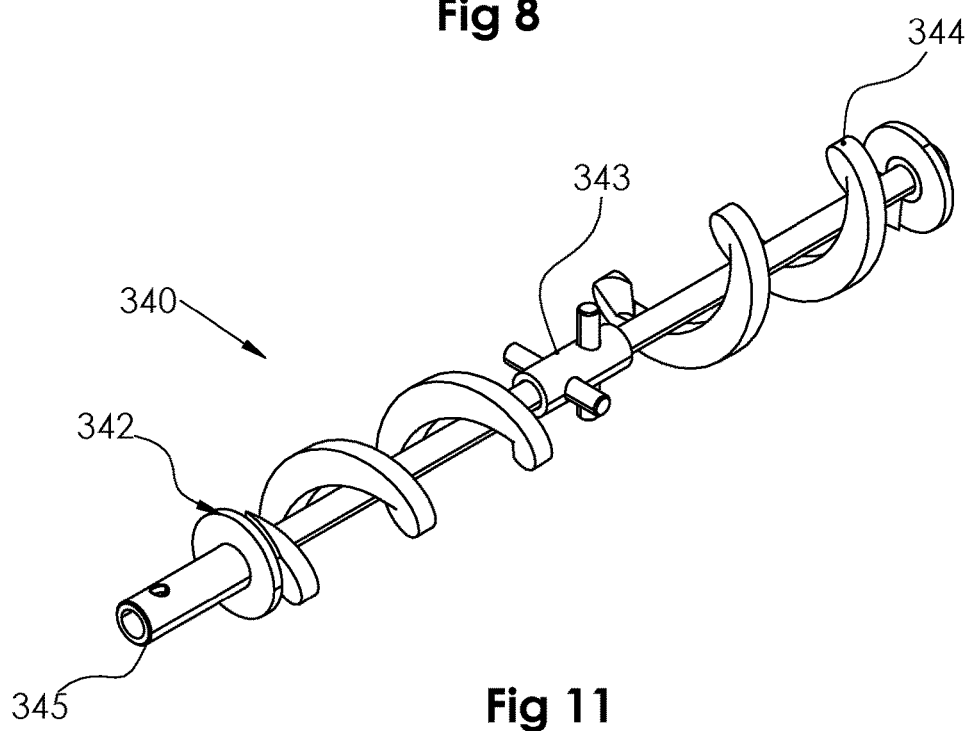
FIG. 11 is a perspective view of a duel auger blade and auger shaft assembly in accordance with embodiments of the invention.
Figure 9:
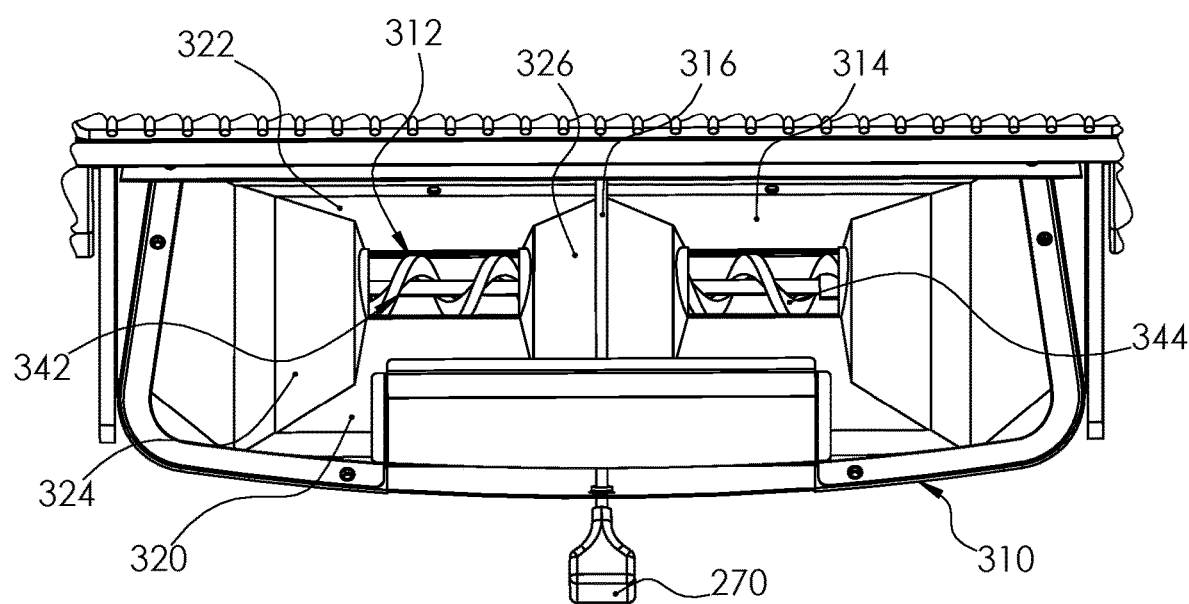
FIG. 9 is a top cut-away view of a duel compartment hopper and duel auger in accordance with embodiments of the invention.

With reference to FIGS. 4, 5 and 10, the first and second electrodes 364 may each include a metallic tip extending away from a surrounding ceramic insulator. Each metallic tip may be comprised of a circular cross-sectional stiff solid wire made of nickel-chromium alloy having a diameter of 1 to 4 millimeters, and more preferably 1.5 to 3.5 millimeters. Each metallic tip may include a bend portion that directs the end of the metallic tip towards the other metallic tip in the pair as shown in FIGS. 7-9. The pair of metallic tips may be bent or otherwise separated by an air gap across which a discharge spark may be provided continuously to ignite pellets in the burn pot 242. Preferably the air gap may be 4 to 6 millimeters, or more preferably 4.5 to 5.5 millimeters. The electrodes 364 may be retained in place using a mounting plate that is secured to the bottom of the grill body 210 by screws or other fastening means. An electrical connector 366, such as conductive wire, may connect the electrodes 364 to a spark generator 360 that is in electrical communication with, and powered by, the battery 372. Preferably, the spark generator 360 may be provided in close proximity to the battery 372. The spark generator 360 may include a booster coil and a Darlington transistor and have a power requirement of 12V/3 A to provide a continuous spark. By "continuous" spark, it is meant to describe a spark that is not a "pulse" spark that jumps the air gap quickly and lasts less than 1 second, but instead a constant arc of spark lasting greater than 1 second, and in some instances lasting constantly for up to 15-20 minutes to create combustion of solid fuel. At grill start up, the spark generator 360 preferably creates a continuous spark for about 4 minutes or more to insure combustion.

While the grill 10 may be powered by an alternating current (AC) power supply in some embodiments, in a preferred embodiment, the grill body 210 may include the battery compartment 370 which receives the battery pack 372. The battery pack 372 may power all onboard electrical components of the grill 10, including without limitation, the readout panel/power supply controller 404, the temperature sensor 402, a meat probe (not shown), the fan assembly 232, the auger motor 348, and the spark generator 360. The battery pack 372 and battery compartment 370 may be electrically connected via a positive battery output (12V+), a negative or ground battery output (12V−), and a battery charge connection to a distribution board. In turn, the distribution board may be electrically connected to a main positive output (12V+), a main negative or ground output (12V−), an AC adapter negative or ground input (12V−), and an AC adapter positive input (12V+). The AC inputs may be connected to the AC recharging receptacle 378 (shown in FIG. 1) adapted to connect to a conventional AC wall socket plug (not shown). In a preferred embodiment, the battery pack may include six (6) lithium-ion cells that provide 5 Ah/8 A output at a maximum/12V. The battery pack 372 may be of sufficient amperage and/or wattage to provide up to 24 or more hours of grill operation in terms of power for the auger 340, the fan assembly 232, and the spark generator 360.

Figure 6:
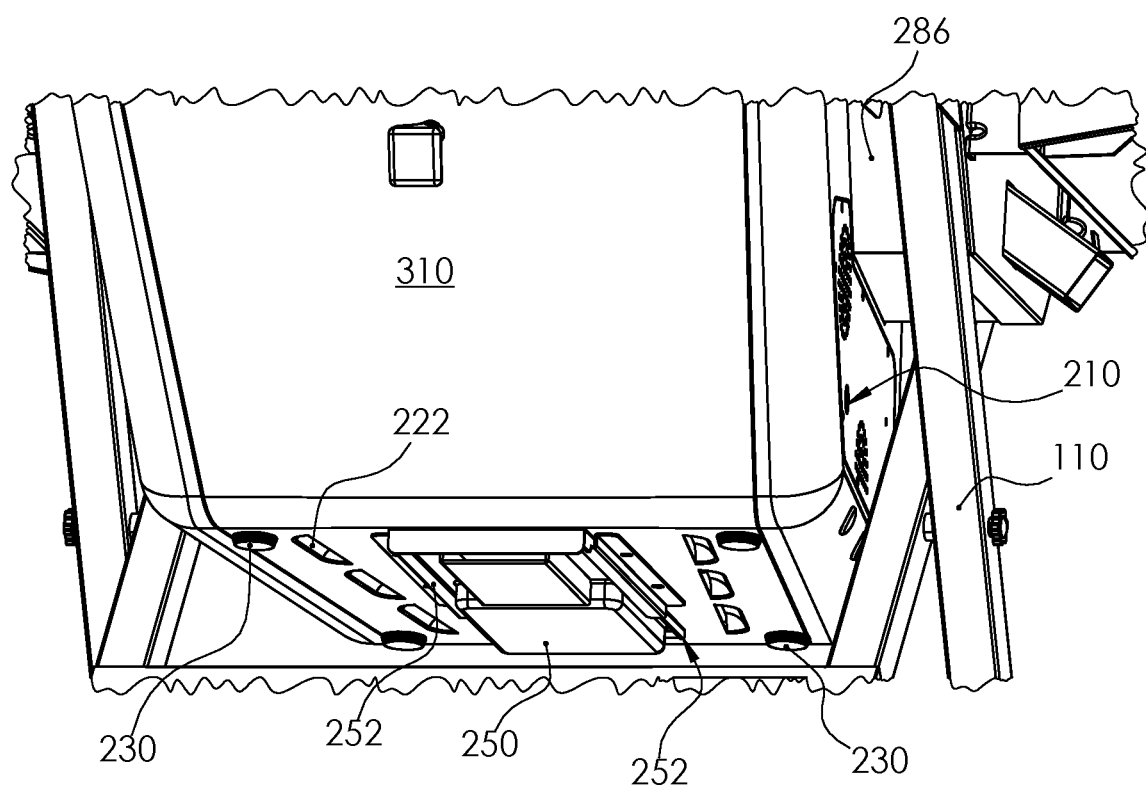
FIG. 6 is a cut-away view of the bottom portion of a pellet grill head unit with a burn pot removable base in a closed position in accordance with embodiments of the invention.

With reference to FIGS. 6 and 7, the retractable feet 230 are illustrated in a retracted position. With reference to FIGS. 6, 7 and 8, the grill body 210 may include two opposing flanges, rails or tracks 252 configured to slidingly receive a removeable burn pot base 250. The flanges 252 may be provided so that the burn pot base 250 may slide forward towards the front hopper 310 and away from the grill body 210. The duel ignitor 364 is visible in FIG. 7 just above the opening at the bottom of the burn pot. The burn pot base 250 may have a forward portion with a raised surface that is essentially flush with the bottom of the grill body 210, and a rear portion with a depression that is configured to collect ash as the burn pot base is pulled forward. The burn pot base 250 may be removed for solid fuel ash clean-out, or unburned solid fuel clean-out/replacement. During a pellet removal process, the auger 340 may be run at high speed under the control of the readout panel/controller 404. Specifically, a method of solid fuel clean-out operation may involve the steps of providing solid fuel in at least one hopper compartment, removing the burn pot base 250, and rotating at least one of the auger blades at a second higher speed than is used for grill burn operation in order to convey solid fuel from the at least one hopper compartment through the open bottom of the burn pot for the clean-out operation.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed:

1. A cooking grill, comprising:
a solid fuel hopper;
a grilling surface;
a burn pot;
an auger system including a first auger blade and a second auger blade; and
a battery operatively connected to the auger system,
wherein the first auger blade has a first pitch configured to convey solid fuel in a first direction and the second auger blade has a second pitch configured to convey solid fuel in a second direction, and wherein the first direction and the second direction are different directions, and
wherein the solid fuel hopper is disposed along a front portion of the cooking grill directly in front of the grilling surface,
wherein the auger system includes an auger shaft connecting the first auger blade and the second auger blade; and
one or more pins disposed between the first auger blade and the second auger blade and connected to the auger shaft, said one or more pins having a central axis extending away from the auger shaft in an orthogonal direction.

2. The cooking grill of claim 1 wherein the solid fuel hopper includes a first compartment and a second compartment.

3. The cooking grill of claim 2 wherein the first compartment is disposed generally above the first auger blade and the second compartment is disposed generally above the second auger blade.

4. The cooking grill of claim 3 wherein the first direction and the second direction are opposite directions taken relative to a reference line.

5. The cooking grill of claim 4 wherein first auger blade and the second auger blade have a colinear axis of rotation.

6. The cooking grill of claim 1 further comprising a control panel and a hopper lid, wherein the control panel is connected to the hopper lid.

7. The cooking grill of claim 6 wherein the first auger blade extends along a left side portion of a front of the cooking grill and the second auger blade extends along a right side portion of a front of the cooking grill.

8. The cooking grill of claim 1 further comprising an auger motor operatively connected to the first auger blade and the second auger blade, wherein the auger motor is configured to rotate the first auger blade and second auger blade at a first speed for burn operation and a second higher speed for solid fuel clean out operation.

9. The cooking grill of claim 1 wherein the first direction and the second direction are opposite directions taken relative to a reference line.

10. The cooking grill of claim 1 wherein first auger blade and the second auger blade have a colinear axis of rotation.

11. The cooking grill of claim 1 wherein the first auger blade extends along a left side portion of a front of the cooking grill and the second auger blade extends along a right side portion of a front of the cooking grill.

12. The cooking grill of claim 1 further comprising an auger motor operatively connected to the first auger blade and the second auger blade, wherein the auger motor is configured to rotate the first auger blade and the second auger blade at a first speed for burn operation and a second higher speed for solid fuel clean out operation.

13. A cooking grill, comprising:
a grilling surface;
a solid fuel hopper disposed along a front portion of the cooking grill directly in front of the grilling surface;
a burn pot;
an auger system disposed between the solid fuel hopper and the burn pot, said auger system including a first auger blade and a second auger blade;
an auger shaft connecting the first auger blade and the second auger blade; and
one or more pins disposed between the first auger blade and the second auger blade,
wherein the one or more pins extend away from the auger shaft in an orthogonal direction more than half the diameter of the auger shaft.

14. The cooking grill of claim 13 wherein the solid fuel hopper includes a first compartment and a second compartment.

15. The cooking grill of claim 14 wherein the first compartment is disposed generally above the first auger blade and the second compartment is disposed generally above the second auger blade.

16. The cooking grill of claim 13 wherein the first auger blade has a first pitch configured to convey solid fuel in a first direction and the second auger blade has a second pitch configured to convey solid fuel in a second direction, and wherein the first direction and the second direction are opposite directions taken relative to a reference line.

17. The cooking grill of claim 16 wherein first auger blade and the second auger blade have a colinear axis of rotation.

18. The cooking grill of claim 13 wherein first auger blade and the second auger blade have a colinear axis of rotation.

19. The cooking grill of claim 13 wherein the first auger blade extends along a left side portion of the front portion of the cooking grill and the second auger blade extends along a right side portion of the front portion of the cooking grill.

20. A cooking grill comprising:
a first auger blade for conveying solid fuel in a first direction;
a second auger blade for conveying solid fuel in a second direction;
an auger motor operatively connected to the first auger blade and the second auger blade;
a battery operatively connected to the auger motor;
a solid fuel hopper having a first compartment and a second compartment;
an auger shaft connecting the first auger blade and the second auger blade; and
one or more pins disposed between the first auger blade and the second auger blade,
wherein the one or more pins extend away from the auger shaft in an orthogonal direction more than half the diameter of the auger shaft, and
wherein the first compartment is disposed generally above the first auger blade and the second compartment is disposed generally above the second auger blade.

21. A method of solid fuel clean-out for a cooking grill, comprising the steps of:
providing a solid fuel hopper having solid fuel in a first compartment and solid fuel in a second compartment;
providing a burn pot positioned in the cooking grill to receive solid fuel from the solid fuel hopper;

providing a first auger blade dedicated to convey solid fuel from the first compartment;

providing a second auger blade dedicated to convey solid fuel from the second compartment;

providing an auger shaft connecting the first auger blade and the second auger blade;

providing one or more pins disposed between the first auger blade and the second auger blade, wherein the one or more pins extend away from the auger shaft in an orthogonal direction more than half the diameter of the auger shaft;

rotating the first auger blade and the second auger blade at a first speed or for a first duration to convey solid fuel from the first compartment and the second compartment for solid fuel burning operation;

removing the burn pot from its position where it receives solid fuel from the solid fuel hopper; and rotating the first auger blade and the second auger blade at a second higher speed or for a second duration significantly longer than the first duration to convey solid fuel from the first compartment and the second compartment for solid fuel clean-out operation.

\* \* \* \* \*